United States Patent [19]

Engelhard et al.

[11] Patent Number: 4,617,444

[45] Date of Patent: Oct. 14, 1986

[54] BURNER FOR WIG WELDING

[75] Inventors: Gerhard Engelhard, Erlangen; Dieter Pellkofer, Herzogenaurach; Jürgen Böhm; Siegfried Förner, both of Erlangen, all of Fed. Rep. of Germany

[73] Assignee: Kraftwerk Union Aktiengesellschaft, Mülheim/Ruhr, Fed. Rep. of Germany

[21] Appl. No.: 718,066

[22] Filed: Apr. 1, 1985

[30] Foreign Application Priority Data

Apr. 6, 1984 [DE] Fed. Rep. of Germany ....... 3413102

[51] Int. Cl.$^4$ ................................................. B23K 9/16
[52] U.S. Cl. ...................................... 219/75; 219/136
[58] Field of Search ............... 219/74, 75, 136, 125.11

[56] References Cited

U.S. PATENT DOCUMENTS

| 3,076,085 | 4/1960 | Sundstrom | 219/75 |
| 4,309,590 | 1/1982 | Stol | 219/136 X |
| 4,467,175 | 8/1985 | Reeh et al. | 219/125.11 X |
| 4,532,406 | 7/1985 | Povlick et al. | 219/136 X |

FOREIGN PATENT DOCUMENTS

| 81086 | 6/1980 | Japan | 219/75 |
| 181472 | 10/1983 | Japan | 219/75 |

Primary Examiner—E. A. Goldberg
Assistant Examiner—Catherine M. Sigda
Attorney, Agent, or Firm—Herbert L. Lerner; Laurence A. Greenberg

[57] ABSTRACT

A burner for WIG-welding for a welding seam having a rod-shaped tungsten electrode with an electrode tip facing the welding seam, a welding wire guide and a protective-gas feed includes a coolant line connected to the electrode and formed of two adjacent channels extending as feed and discharge lines on mutually opposite sides of the electrode, the electrode tip projecting through a heat-resistant insulating cap overlapping ends of the coolant channels which face towards the electrode tip, and the protective-gas feed including protective-gas feed lines insulatedly fastened to a side of the coolant channels facing away from the electrode, the protective-gas feed lines having a region extending out of the insulating cap and formed with outlet openings directed towards the welding seam.

7 Claims, 4 Drawing Figures

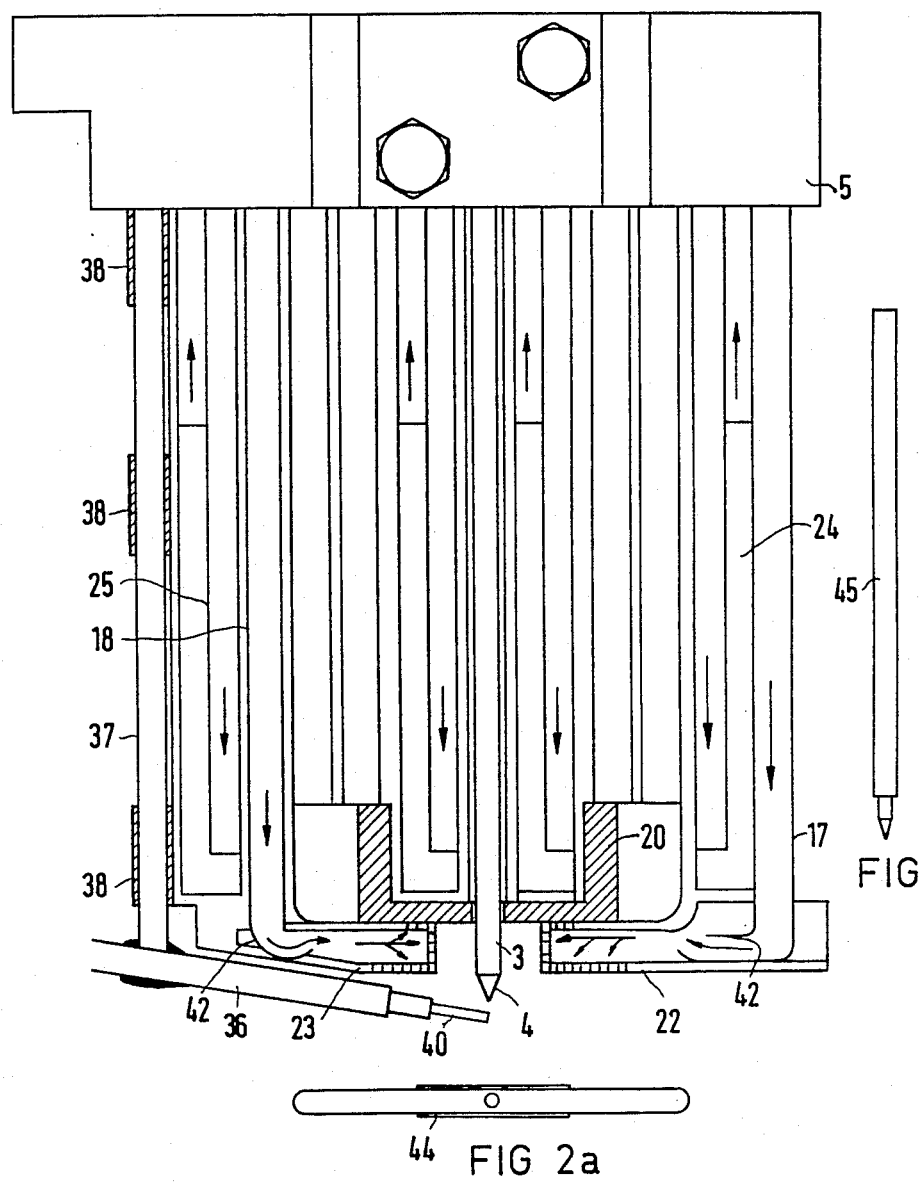

BURNER FOR WIG WELDING

The invention relates to a burner for WIG (tungsten-inert gas) welding of a welded seam and, more particularly, to such a burner having a rod-shaped tungsten electrode with an electrode tip facing the welding seam, a coolant line connected to the electrode, a welding-wire guide and a protective-gas feed.

Such a burner is disclosed, for example, in U.S. Pat. No. 3,076,085. It has a generally axially symmetrical construction. The electrode is formed of a tungsten electrode only at the tip thereof. It is mounted at the end of an electrode body facing towards the workpiece and is provided with mutually concentric ring channels for a coolant. The electrode body is surrounded by a cladding tube, so that a further ring channel for feeding-in the protective gas is formed. The electrode body and the tip of the electrode enclose a central channel which likewise serves for feeding-in protective gas.

The foregoing heretofore-known burner is provided for very large currents of more than 4000 amps. This leads to very large diameters of the heretofore known construction which are in the range of about 2 cm or more.

It is, on the other hand, an object of the invention to provide a burner which is particularly well suited for so-called narrow-gap welding. In this regard, the gap to be filled by the welding process is only a few mm wide. Its maximum width depends primarily upon the electrode diameter, the strength of the current and the voltage as well as upon the type of weld material. The welded seam need be only so wide that the dynamic pressure of the arc is sufficient to prevent the arc from giving way, even in the presence of magnetic fields. Flank-binding effects are thereby supposed to be avoided. The gap to be filled with the welding material also has only a small aperture angle of 2° to 4°, for example, which is determined by the shrinkage of the parts. For this reason, the burner should be narrow over a considerable length so that it is not subject to short circuits while the sea is being filled or it does not jam mechanically.

With the foregoing and other objects in view, there is provided, in accordance with the invention, a burner for WIG-welding for a welding seam having a rod-shaped tungsten electrode with an electrode tip facing the welding seam, a welding wire guide and a protective-gas feed, comprising a coolant line connected to the electrode and formed of two adjacent channels extending as feed and discharge lines on mutually opposite sides of the electrode, the electrode tip projecting through a heat-resistant insulating cap overlapping ends of the coolant channels which face towards the electrode tip, and the protective-gas feed comprising protective-gas feed lines insulatedly fastened to a side of the coolant channels facing away from the electrode, the protective-gas feed lines having a region extending out of the insulating cap and formed with outlet openings directed towards the welding seam.

As thorough tests have shown, the burner, according to the invention, is extremely well suited for the precision welding of sheetmetal between 5 and 20 mm thick with currents of up to several hundred amps. It has a flat shape, the individual parts thereof being arranged symmetrically on both sides of the rod-shaped electrode in a common plane. In this plane, the burner has a dimension of more than 60 mm, primarily because of the cooling system and the protective-gas feed. Transversely to this plane, however, a width of only about 5 mm of the burner is sufficient. The rod-shaped tungsten electrode which carries the current over the entire length is advantageously only about 2 to 4 mm thick.

In accordance with another feature of the invention, the coolant channels are U-shaped and are disposed in a common plane. Thereby, conduction from one side of the electrode to the other is avoided, which would otherwise require more space in the width. Such a construction can be realized to particular advantage by a body of highly conductive material, especially of copper, into which the channels are milled. The depressions formed thereby are then closed off by a cover sheet which can be soldered thereon. Such cooling channels extend as closely as possible to the tip so as to reduce burn-off thereof and thus increase the life or durability thereof.

In accordance with a further feature of the invention, the burner includes flat coolant lines connected with the protective-gas feed lines and disposed with the coolant channels of the electrode in a common plane. With this construction, compensation is provided in that although the narrow gap leads to a greater heat build-up also in the protective-gas lines, the heating-up thereof is reduced by the cooling. A uniform gas enclosure or mantle can thereby be attached with laminar flow under all operating conditions.

In accordance with an added feature of the invention, the burner includes a welding-wire feed fastened to one of the protective gas feed lines, the welding-wire feed being adjustable in longitudinal direction of the electrode, and in accordance with an alternative feature, the burner includes a welding-wire feed fastened to one of the flat coolant lines connected to one of the protective gas feed lines, the welding wire feed being movably adjustable in longitudinal direction of the electrode.

The welding-wire feed can also be seated on a protective-gas bell, which is referred to in greater detail hereinafter. In any case, the wire supply, via a spring system, can automatically be accommodated with or matched to the motions of the burner which are caused, for example, by the arc control (AVC).

In accordance with an additional feature of the invention the protective-gas feed lines have angle-shaped regions extensible parallel to the bottom of the welding seam, the angle-shaped regions comprising replaceable gas nozzles having flow guides for producing a laminar gas flow therethrough. With the flow guides of the gas nozzles, the gas covering the arc flows largely in laminar mode without much turbulence, whereby the consumption of protective-gas can be reduced.

In accordance with yet another feature of the invention, the burner includes a protective-gas bell for covering the welding seam, the bell having a viewing window, and a water cooling system for reducing the temperature of the protective gas in the bell, the bell being capable of absorbing visible light and ultraviolet light, and being adjustable in position in longitudinal direction of the electrode. The consumption of protective gas is thus further reduced, and the burner dimensions may also be reduced. The bell is particularly effective if the depth of the seam is small. For this reason, it is adjustable in longitudinal direction of the electrode for accommodation to different seam depths, so that only a small gap is located opposite the work piece through which protective gas escapes. If the bell is made absorbent to visible light and ultraviolet light radiation, the stress of the welding can be reduced considerably.

In accordance with yet a further feature of the invention, the electrode tip is angle-shaped, and the electrode is rotatably mounted and carries a drive disc at an end thereof facing away from the electrode tip, the drive disc being engaged by a motor actuator for rotating the electrode.

This affords a more accurate guidance of the arc over the width of the welded seam in order to prevent bonding defects at the walls of the seam. An adjustment can thus also be provided during the welding process in view of the provision of the drive disc engaged by the motor actuator.

In accordance with other features of the invention, the drive disc comprises an eccentric for effecting a swinging motion and the eccentric is adjustable so as to vary the eccentricity thereof. For different seam widths which result from an inclination of the seam walls, this adjustability of the eccentricity is useful.

In accordance with yet an additional feature of the invention, all outwardly directed metal surfaces of the burner except for the electrode tip are covered with heat-resistant electric insulation.

In accordance with a concomitant feature of the invention, the burner includes a guide disposed between a respective protective-gas feedline and the electrode for sliding in at least one of an endoscope, a glass-fiber optical system and an illuminating device.

Other features which are considered as characteristic for the invention are set forth in the appended claims.

Although the invention is illustrated and described herein as embodied in a burner for WIG welding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is an enlarged fragmentary view, partly in section, of FIG. 1; and

FIGS. 2a and 2b are true-to-scale bottom plan and side elevational views, respectively, of the burner of FIGS. 1 and 2.

Figure 1:
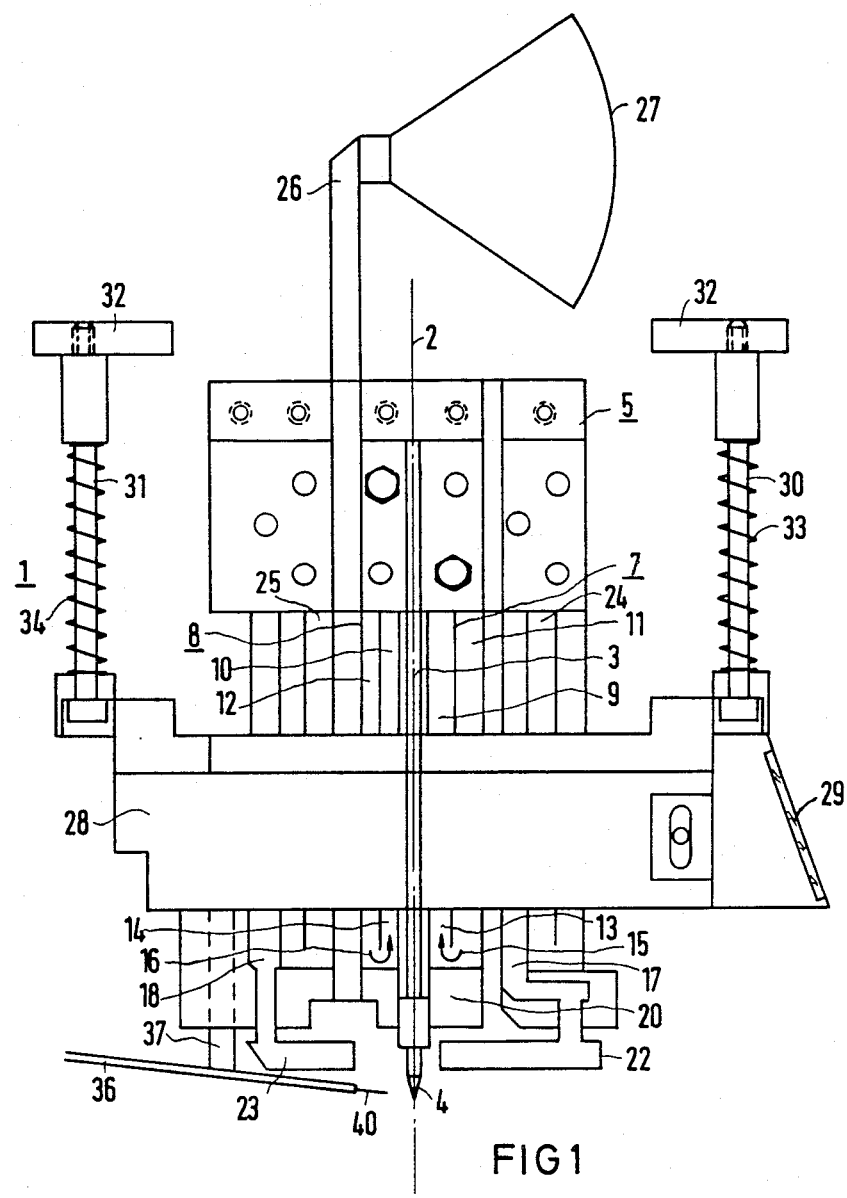
FIG. 1 is a diagrammatic front elevational view of the burner for WIG welding constructed in accordance with the invention.

Referring now to the drawing, and first, particularly, to FIG. 1 thereof, there is shown a burner according to the invention identified as a whole by reference numeral 1. It is suitable for assembly and use with any commercially available WIG equipment, especially for mechanized welding with so-called orbital heads. The burner 1 is constructed largely symmetrically to an axis 2 represented by a dot-dash line which extends through a rod-shaped tungsten electrode 3. The electrode 3 has, for example, a length of 25 mm from its tip 4 to its fastening in a clamping block 5, and a diameter of 4 mm.

The electrode 3 is in highly heat-conducting contact with two heat sinks 7 and 8 which are arranged on opposite sides of the electrode 3. The heat sinks 7 and 8 are copper strips which are 4 mm thick and which each contain two milled-in coolant channels 9 and 10, respectively, which extend in a U-shape as feedlines 11 and 12 to the electrode tip 4 and as discharge lines 13 and 14 from the electrode tip 4 to the clamping block 5, as arrows 15 and 16 show. Water is used as the coolant.

Two protective-gas feedlines 17 and 18 are provided in one plane together with the heat sinks 7 and 8 on a respective side thereof facing away from the electrode 3. The feedlines 17 and 18 run parallel to the electrode 3 up to the vicinity of an insulating cap 20 which is placed over the free ends of the heat sinks 7 and 8. The ends of the protective-gas feedlines 17 and 18 facing the electrode tip 4 and, accordingly, facing the seam which is to be welded, each have an angle-shaped region 22, 23 which extends parallel to the bottom of the seam. Each of these regions 22 and 23 is constructed as a nozzle body and provided with outlet openings of the protective gas. The nozzle bodies 22 and 23 are advantageously replaceable.

Two further flat coolant lines 24 and 25 are connected to the protective-gas feedlines 17 and 18 and can likewise be realized as copper strips with milled-in slots and a cover plate. The coolant lines 24 and 25 are located between the electrode 3 and the respective protective-gas feedlines 17 and 18 so that a thermal shielding is effected. The flat coolant lines 24 and 25 are connected via insulating plug connections to the voltage-carrying heat sinks 7 and 8. The intermediate space created thereby is utilized for accommodating a display 26 which, in the form of an endoscope, a glass-fiber optics system or the like, permits observation of the welded seam in the vicinity of the electrode tip 4. A ground-glass pane 27, for example, may be connected to the display.

A protective-gas bell 28 extends over the burner 1 with the electrode 3 and the heat sinks 7 and 8 thereof as well as the protective-gas feedlines 17 and 18, and has, on the right-hand side of FIG. 1, a region 29 of glass-clear mineral material as a viewing window. The protective-gas bell 28 serves, among other things, as a thermal shield and as a radiation shield and is provided with an otherwise non-illustrated water cooling system. The temperature of the protective gas is thereby also reduced. To prevent the protective gas flowing off, the bell 28 should sit as tightly as possible on the workpiece which is to be welded. To this end, the bell 28 may be fastened to two screws 30 and 31 which are mounted in a frame 32 and, in fact, against the action of springs 33 and 34 which force the bell 28 in a direction towards the electrode tip 4.

To the protective-gas bell 28, there is connected, on the side of the protective-gas line 18 facing away from the electrode 3, a guiding tube 36 with a holding rod 37 which is supported in a bearing body 38 (FIG. 2). The guide tube 36 serves for feeding additive material 40, which is introduced as welding wire, into the vicinity of the electrode tip 4.

FIG. 2, being of a larger scale than FIG. 1, shows clearly that the angle-shaped regions 22 and 23 as nozzles have finely distributed outlet openings and flow guides 42, so that a protective-gas flow which is as laminar as possible is produced.

The true dimensions of the burner 1 are apparent from FIGS. 2a and 2b showing the burner cross section 44 and a side view 45 thereof, respectively. In spite of the small dimensions, the metallic parts of the burner 1 are electrically insulated. This purpose is served by an application of heat-resistant varnish which may contain mica, as well as by the insulating cap 20. It is possible, thereby, to ignite the arc to the electrode tip 4 by contact and/or by high frequency.

In the illustrated embodiment, the electrode tip 4 is shown as being axially symmetrical. However, it may also be angle-shaped for adapting to or accommodating larger welding-gap widths and, during the welding operation, may be moved back and forth over the width of the welding gap by means of a preferably adjustable eccentric. This is especially advantageous when filling deep welding gaps, the upper weld layers of which must be considerably wider than the layers at the root of the welding gap even if the inclination of the gap wall is small.

We claim:

1. Burner for WIG-welding a welding seam having a rod-shaped tungsten electrode with an electrode tip facing the welding seam, a coolant line connected to the electrode, and a welding wire guide and a protective-gas feed formed with outlet openings directed towards the seam to be welded, comprising U-shaped coolant channels of copper connected to the tungsten electrode on opposite sides thereof and extending close to the electrode tip, the tungsten electrode being 2 to 4 mm thick, and said coolant channels being disposed in a common plane with the tungsten electrode at a location of the burner which is only 5 mm wide, the electrode tip projecting through an heat resistant insulating cap engaging over ends of said coolant channels facing towards the electrode tip, said coolant channels having a region extending out of said insulating cap and covered with an heat resistant electrically insulating varnish, the protective-gas feed comprising protective-gas feed lines insulatingly fastened to a side of said coolant channels facing away from the tungsten electrode.

2. Burner according to claim 1, including flat coolant lines connected to said protective gas feed lines and disposed in said common plane with said coolant channels of the tungsten electrode.

3. Burner according to claim 1, wherein said protective-gas feed lines have angled-off regions thereof extending parallel to the seam to be welded, said angled-off regions being exchangeable.

4. Burner according to claim 1, including a protective-gas bell covering the welding seam to be welded, said bell being formed with a viewing window and with water cooling for reducing the temperature of the protective gas.

5. Burner according to claim 4, wherein said protective-gas bell is capable of absorbing light and ultraviolet radiation.

6. Burner according to claim 1, including guiding means for introducing an endoscope between said protective-gas feed lines and the tungsten electrode, as well as means for illumination.

7. Burner according to claim 1, including guiding means for introducing a glass-fiber optical system between said protective-gas feed lines and the tungsten electrode, as well as means for illumination.

* * * * *